United States Patent [19]
Lech, Jr.

[11] 4,446,955
[45] May 8, 1984

[54] CLUTCH DRIVEN PLATE ASSEMBLY WITH A FLOATING HUB

[75] Inventor: Thaddeus Lech, Jr., Sterling Heights, Mich.

[73] Assignee: Borg-Warner Corporation, Chicago, Ill.

[21] Appl. No.: 212,925

[22] Filed: Dec. 4, 1980

Related U.S. Application Data

[63] Continuation-in-part of Ser. No. 166,267, Jul. 3, 1980, abandoned.

[51] Int. Cl.³ .......................... F16D 3/12; F16D 13/68
[52] U.S. Cl. .............................. 192/106.2; 192/70.16; 192/70.17; 192/106.1; 464/68
[58] Field of Search ................... 192/106.2, 106.1, 55, 192/70.16, 70.17, 70.19, 70.20; 464/64, 67, 68, 158, 81

[56] References Cited

U.S. PATENT DOCUMENTS

| | | | |
|---|---|---|---|
| Re. 27,126 | 5/1971 | Gingery | 192/70.13 |
| 2,026,733 | 1/1936 | Fast | 192/106.2 |
| 2,269,799 | 1/1942 | Upson | 464/89 |
| 2,276,416 | 4/1942 | Nutt | 192/106.2 |
| 3,218,828 | 11/1965 | Thelander | 464/64 |
| 3,362,194 | 1/1968 | Bertelson et al. | 192/106.2 X |
| 3,428,155 | 2/1969 | Binder et al. | 464/68 X |
| 3,556,273 | 1/1971 | Maucher | 192/106.2 |
| 3,800,931 | 4/1974 | Maucher | 192/106.2 |
| 4,016,962 | 4/1977 | Black | 192/70.2 |
| 4,185,728 | 1/1980 | Gatewood | 192/106.2 |

*Primary Examiner*—Rodney H. Bonck
*Attorney, Agent, or Firm*—James A. Geppert

[57] ABSTRACT

A clutch driven plate assembly for use in an automotive vehicle having a hub assembly with an inner hub in splined engagement with a transmission input shaft, an outer hub, and a hub flange integral with one of the hubs and extending between the clutch and spring retainer plates. Either the inner and outer hubs or the inner hub and transmission input shaft are operatively connected by helical splines or threads allowing relative axial movement between the hubs resulting in a screwing and unscrewing action when the clutch is engaged, the transmission is in neutral and the engine is at idle rpm to dissipate the irregular impulses of the vehicle engine.

50 Claims, 45 Drawing Figures

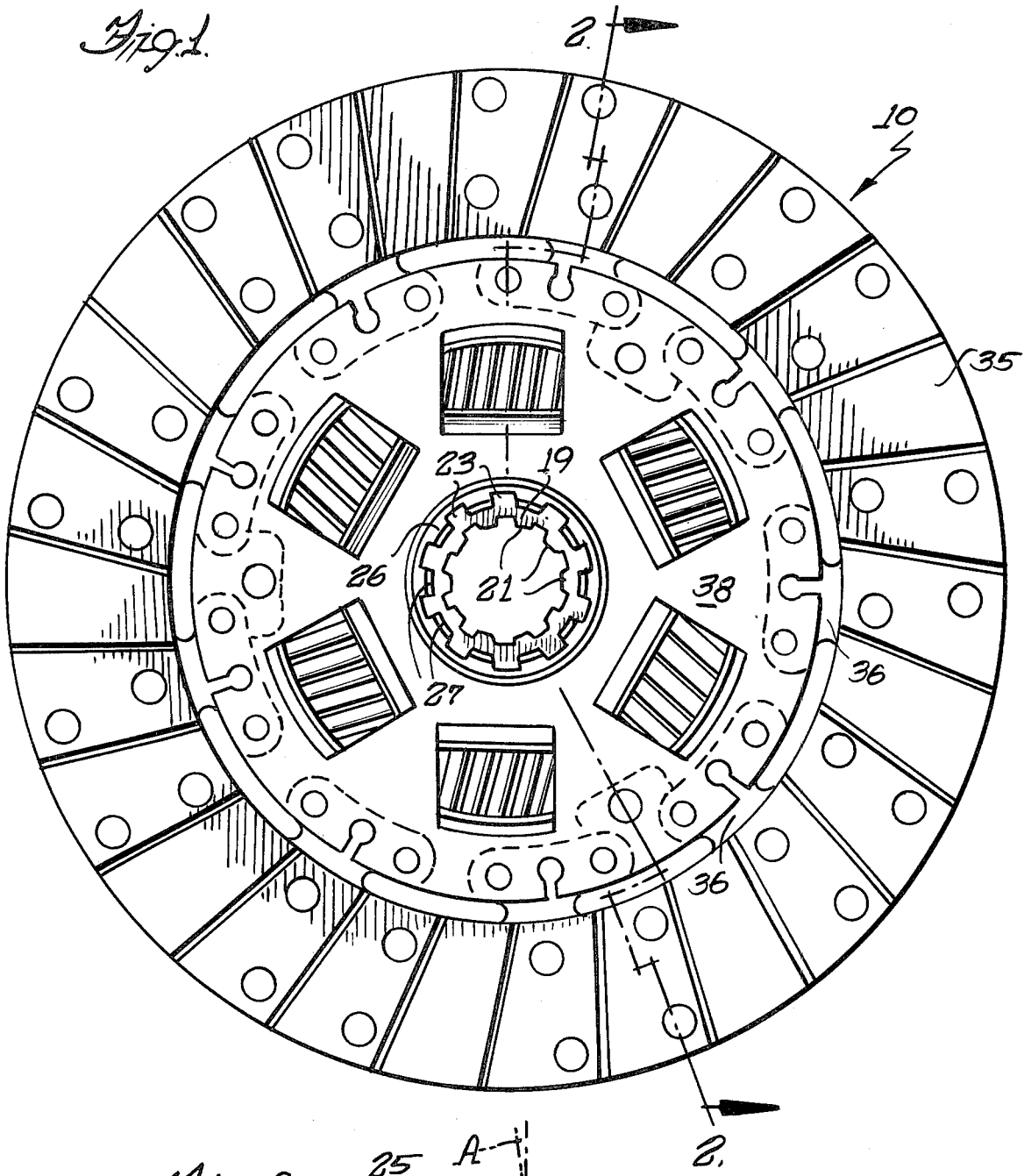
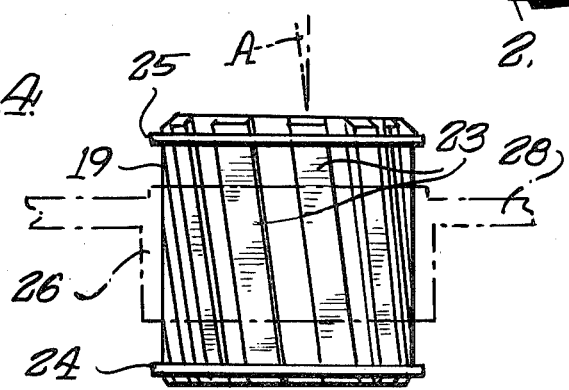

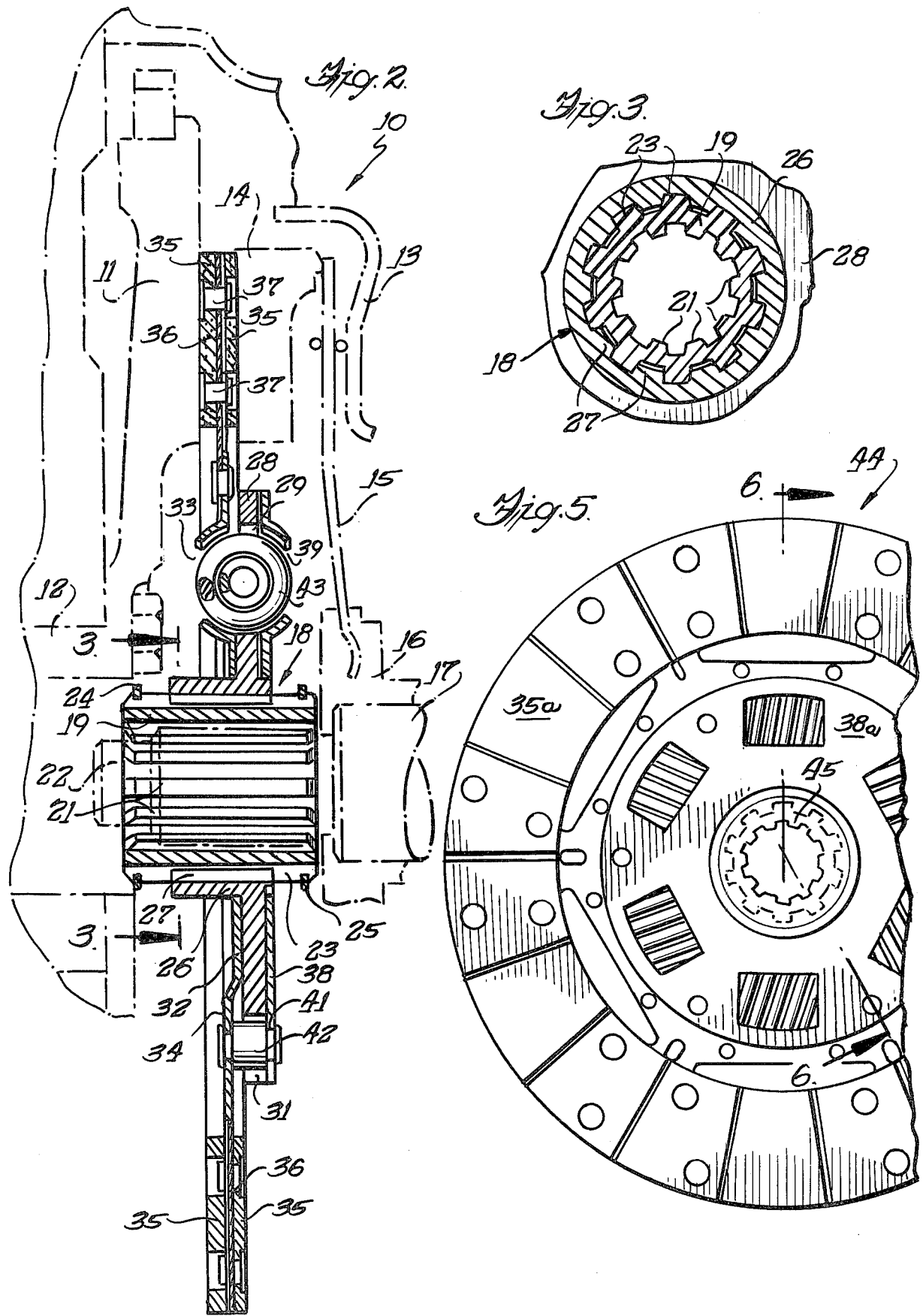

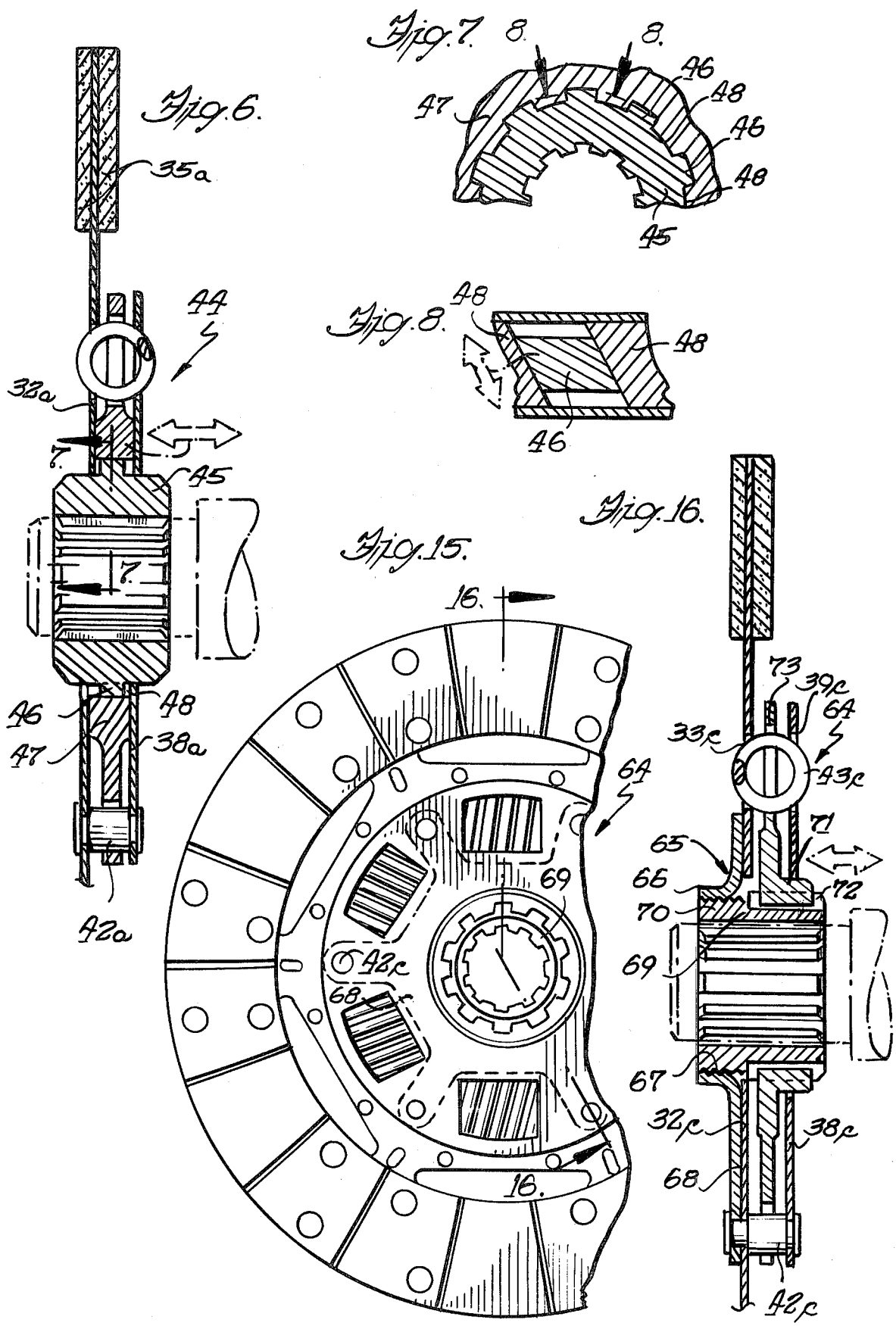

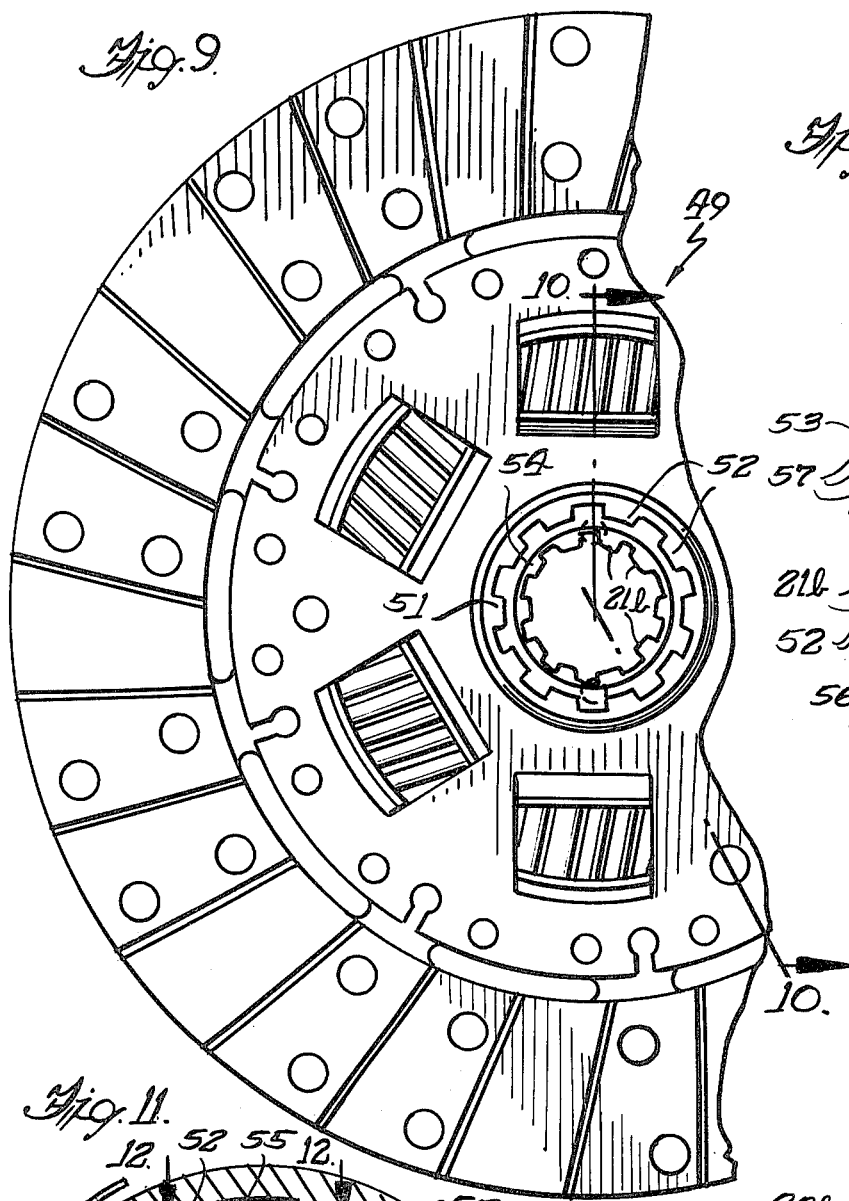
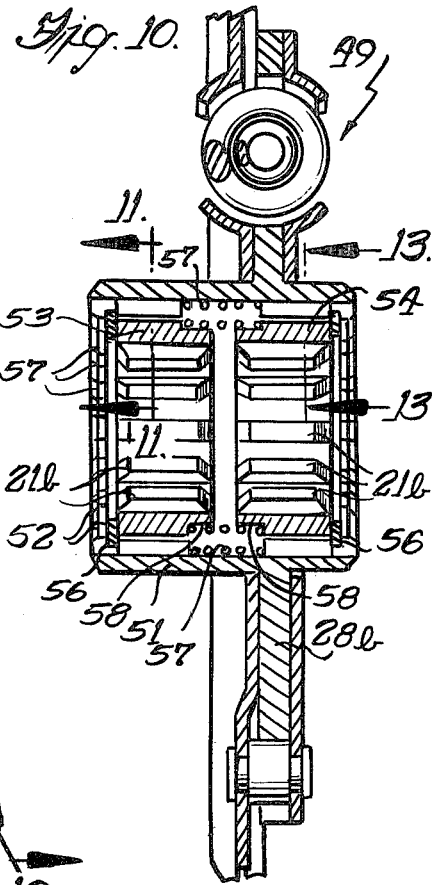
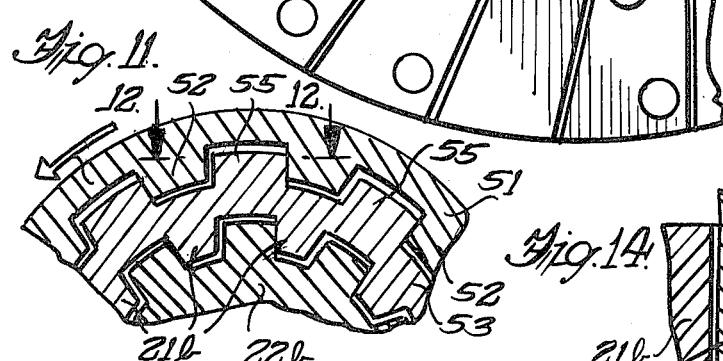
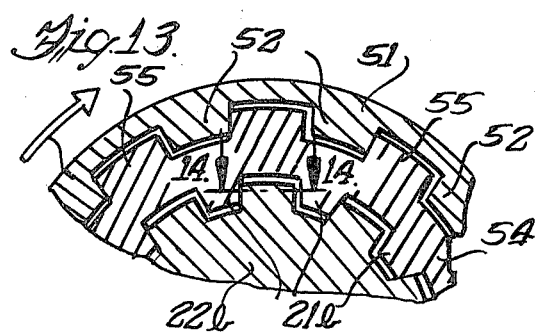
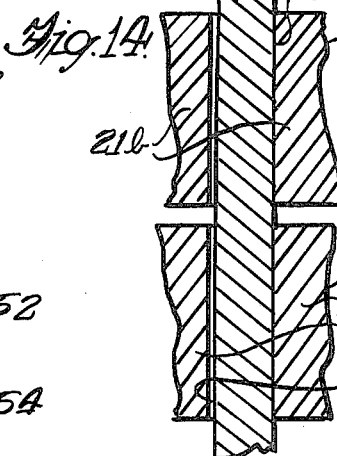
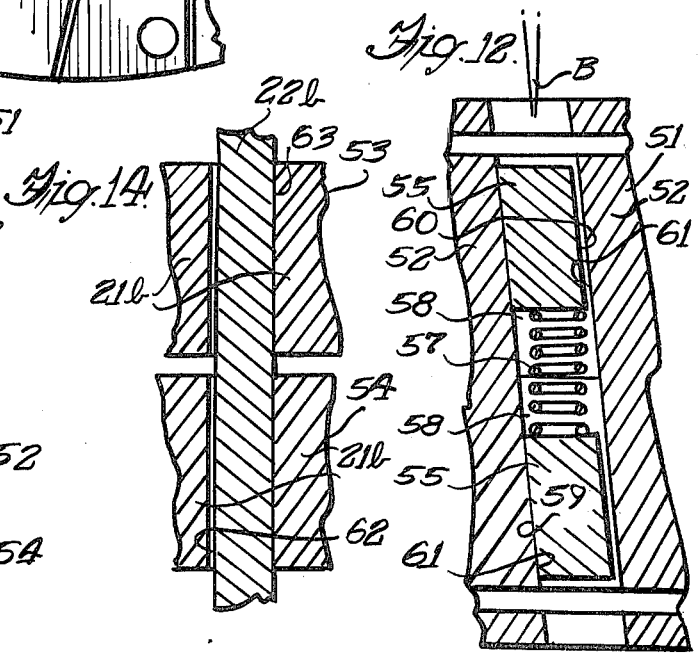

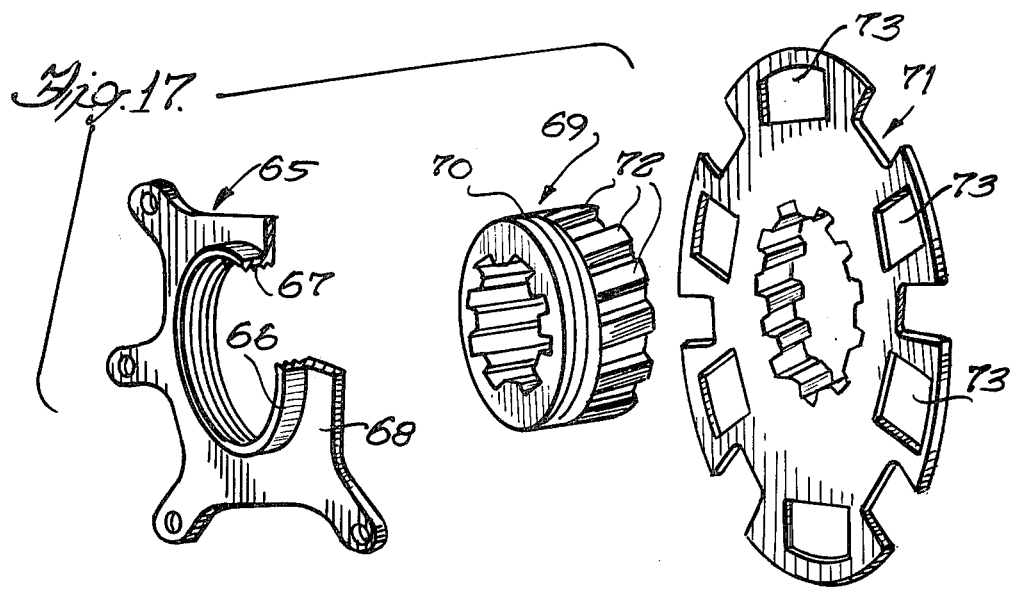
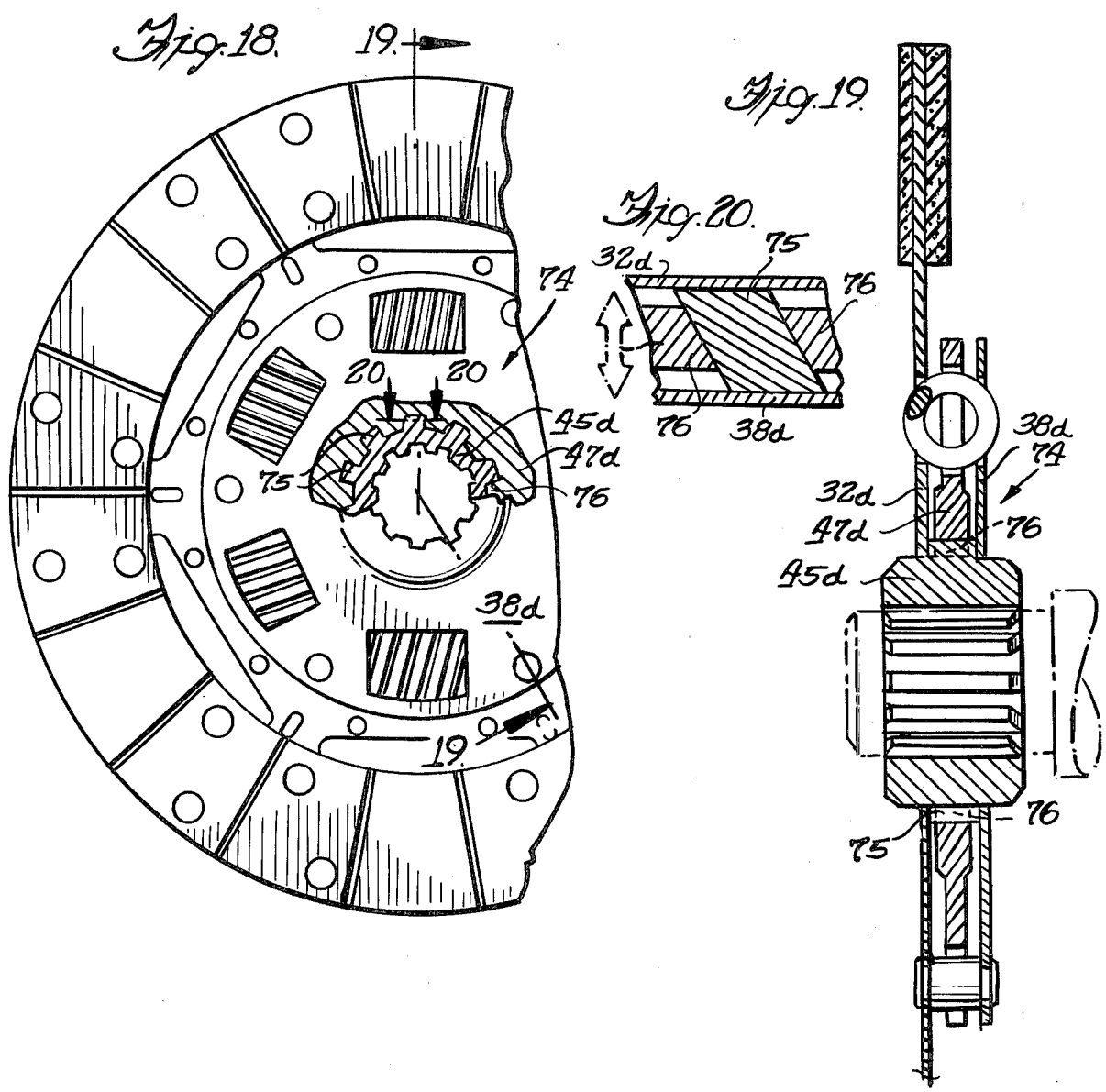

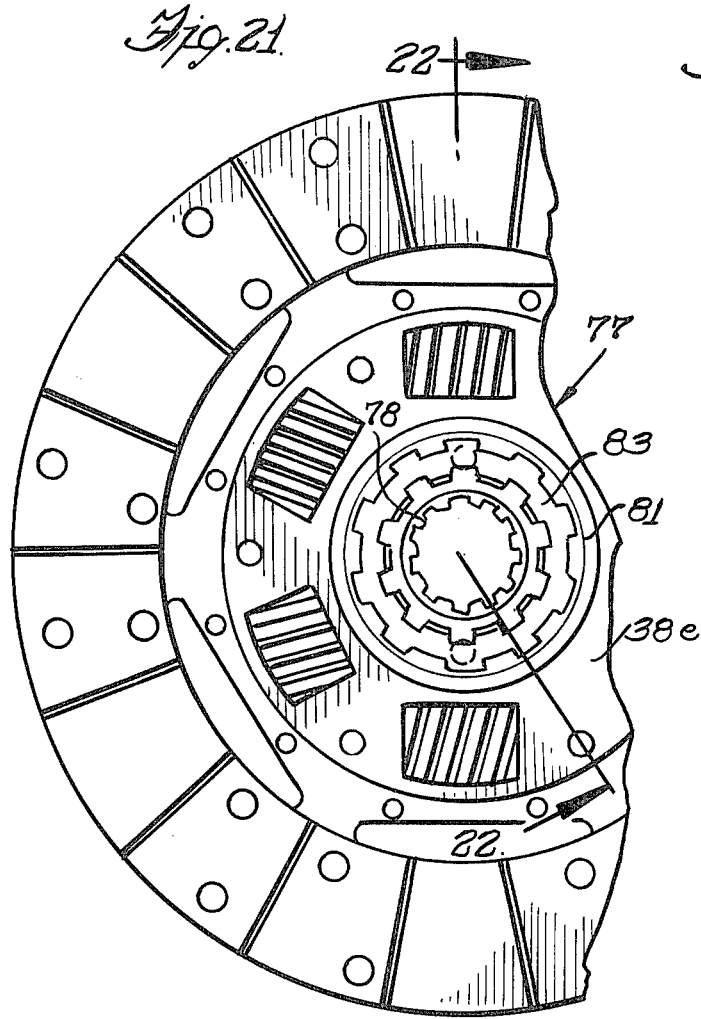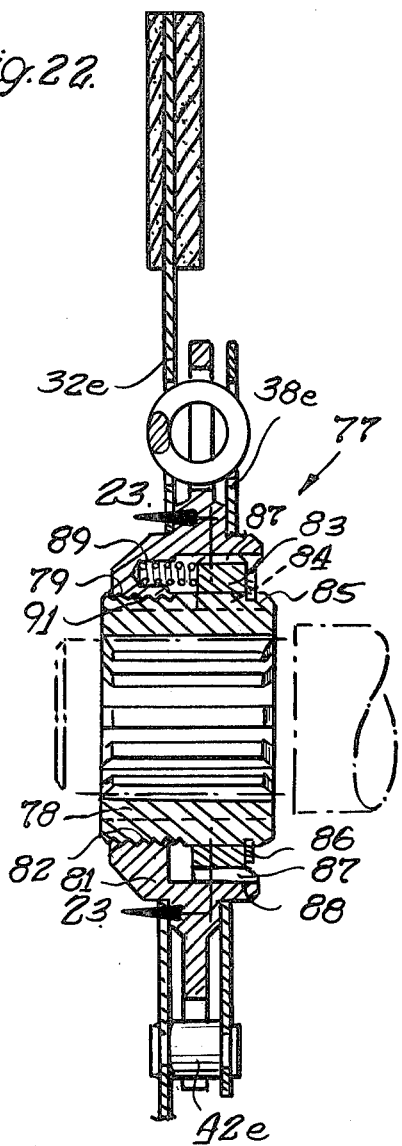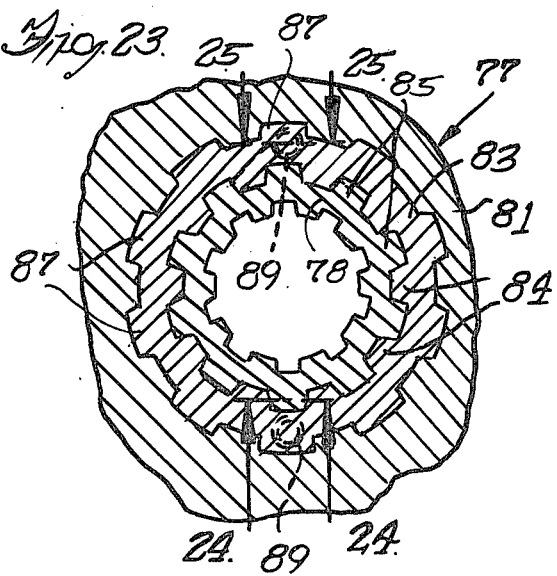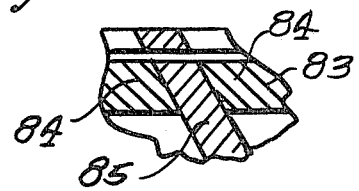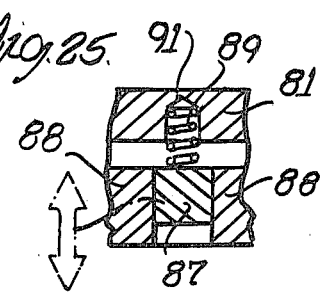

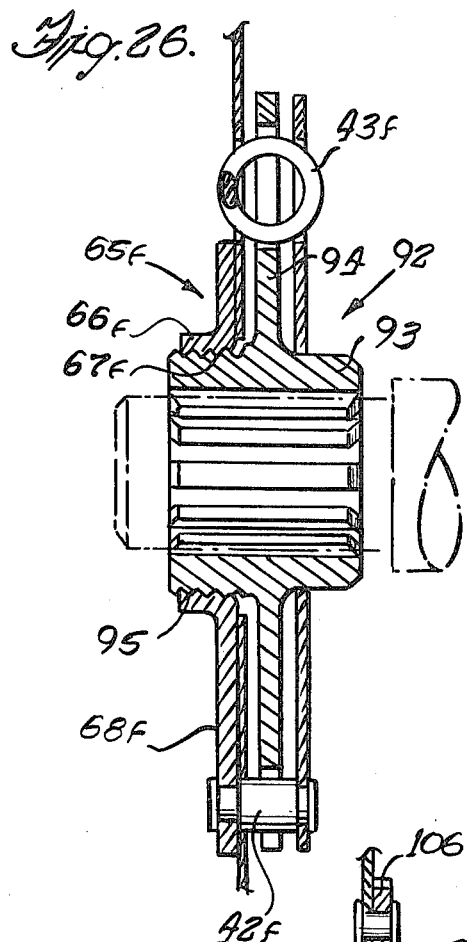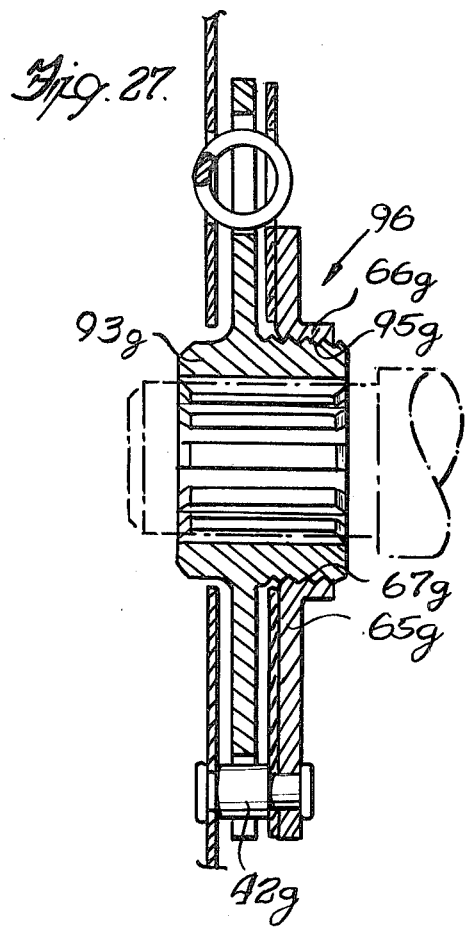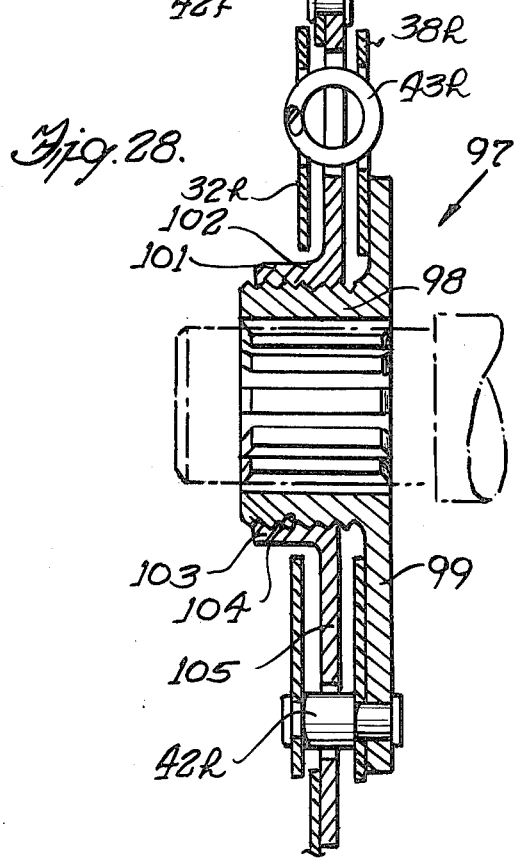

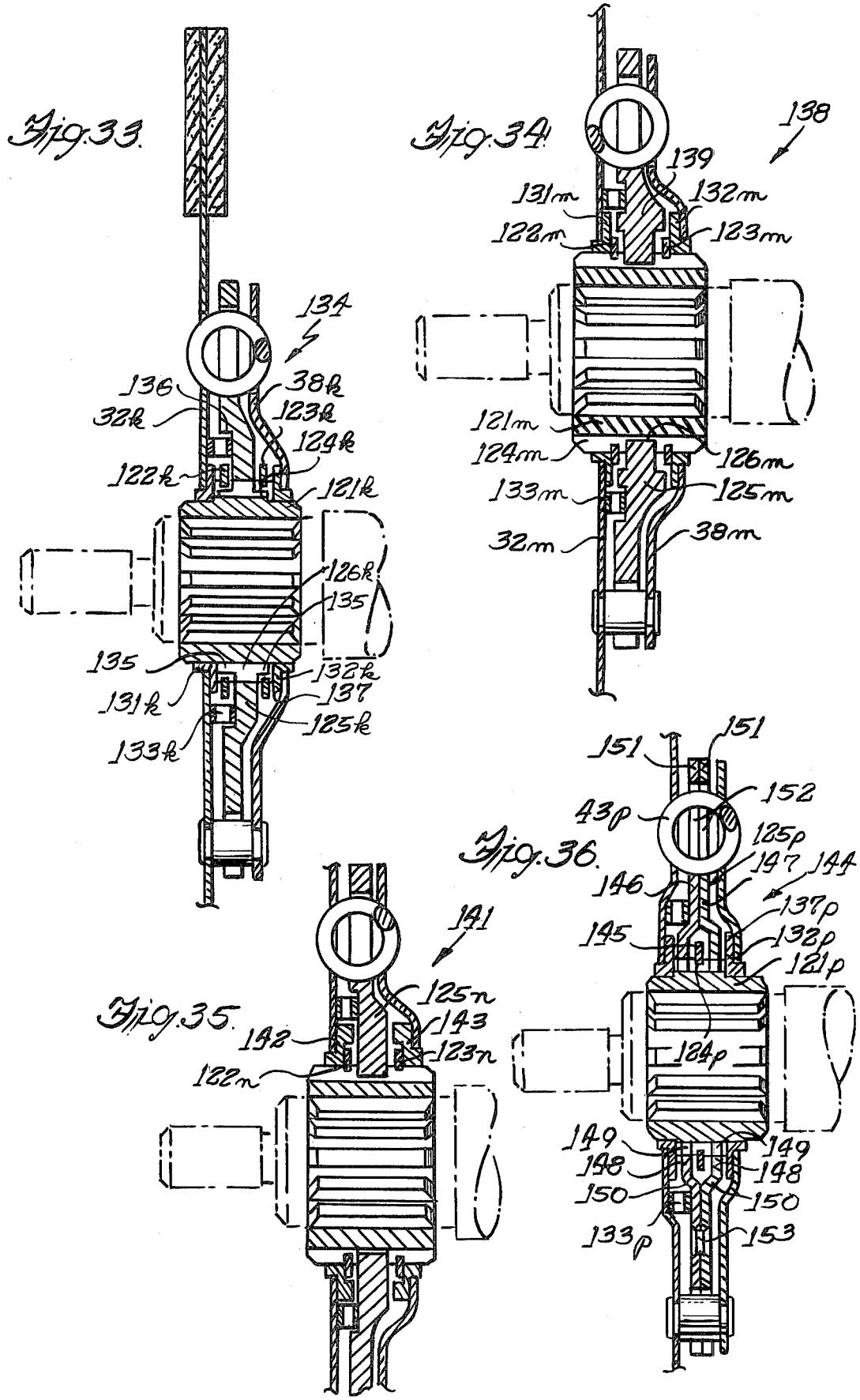

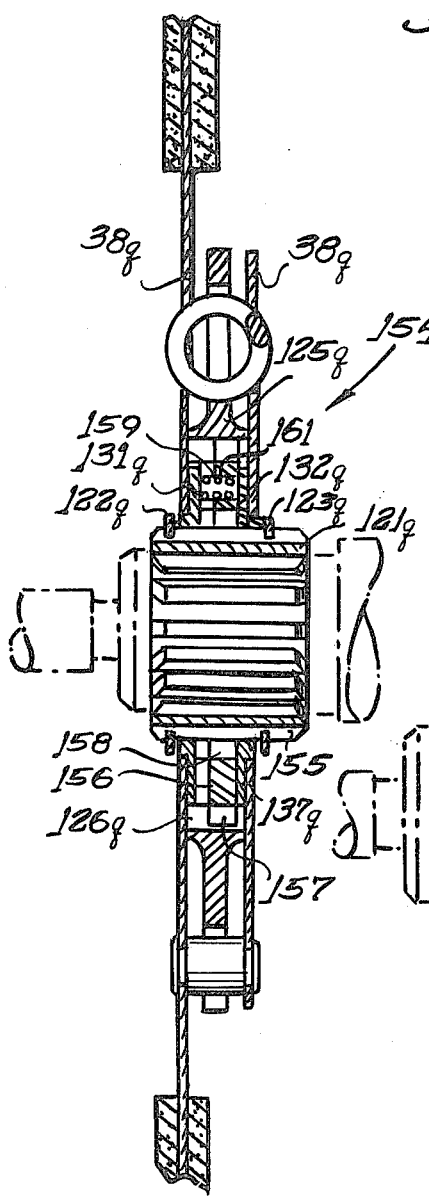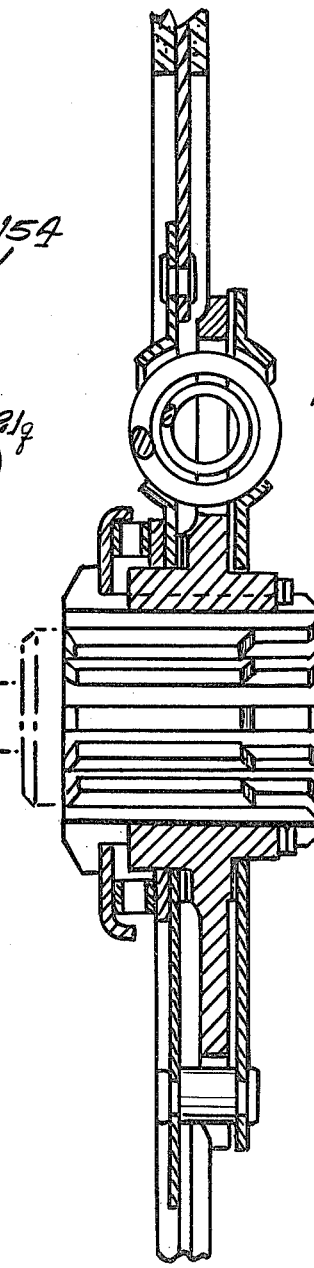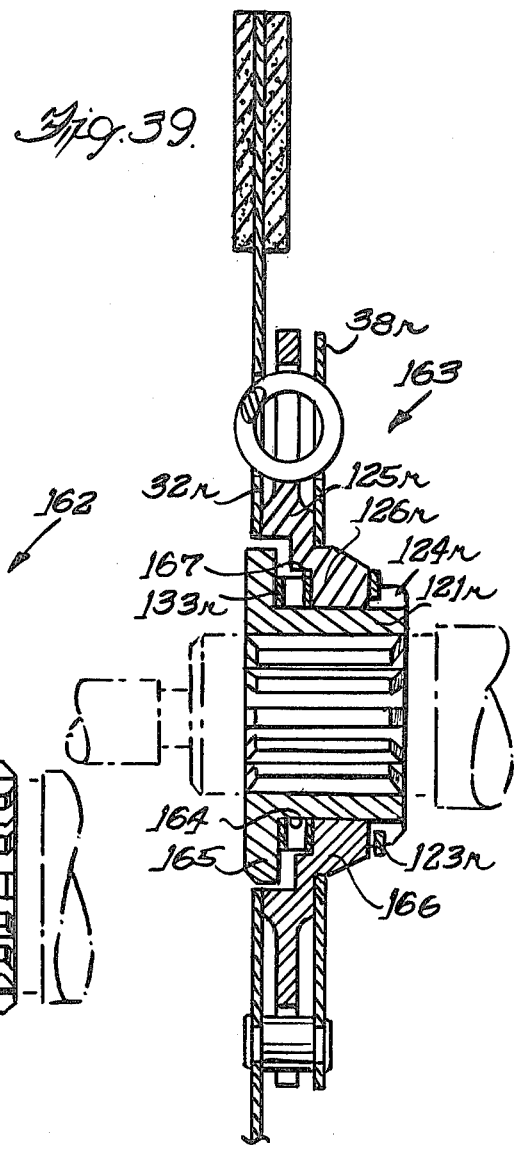

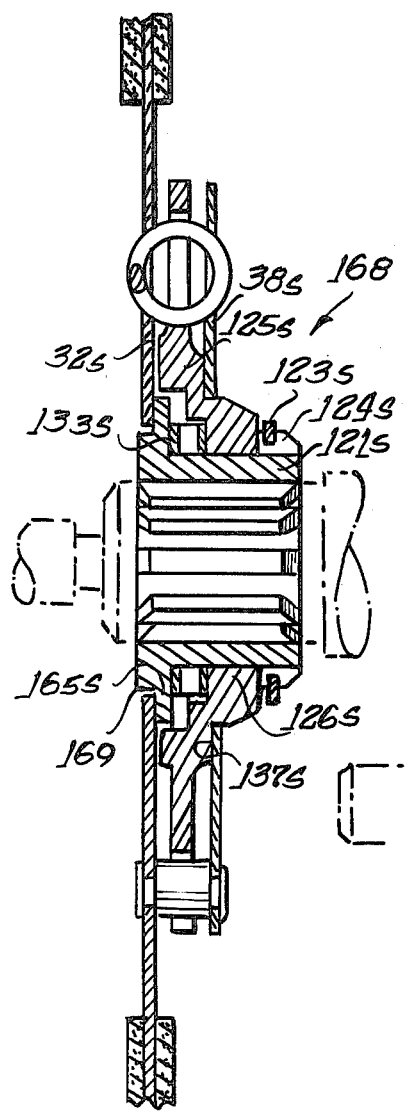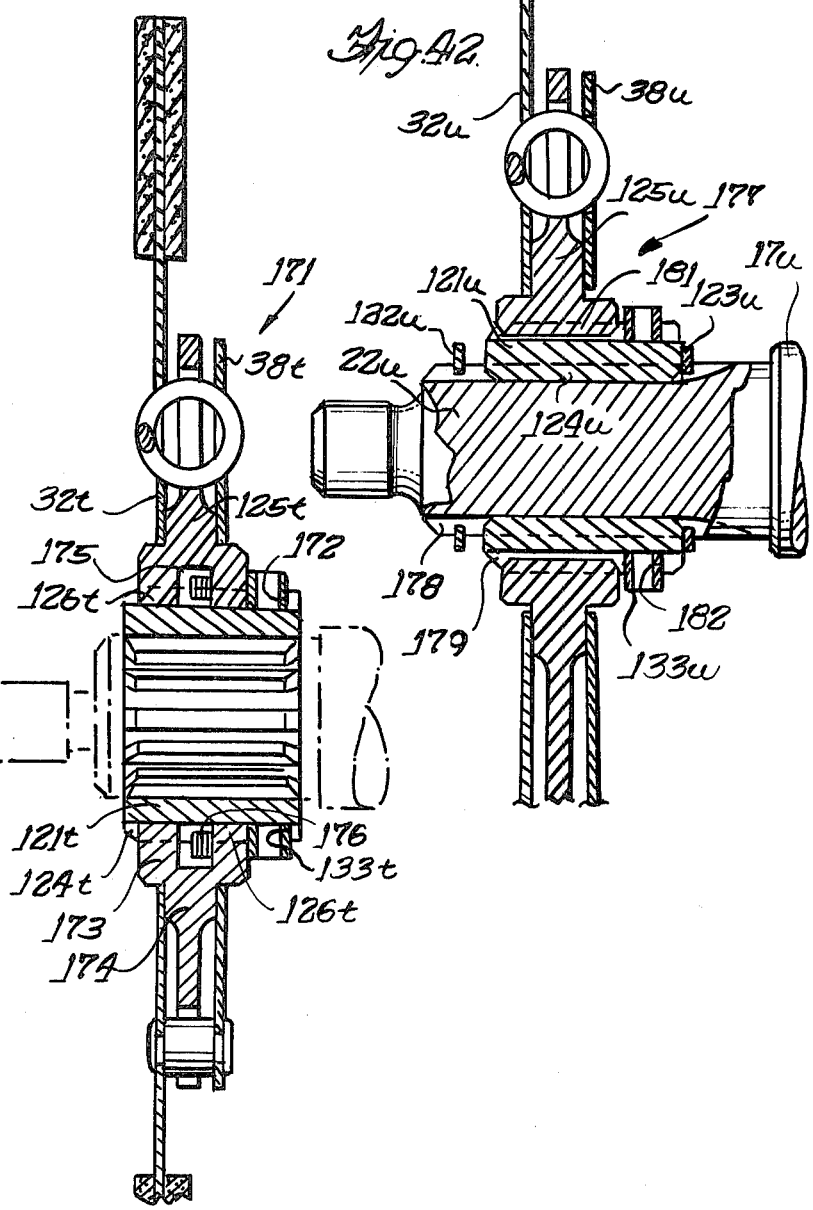

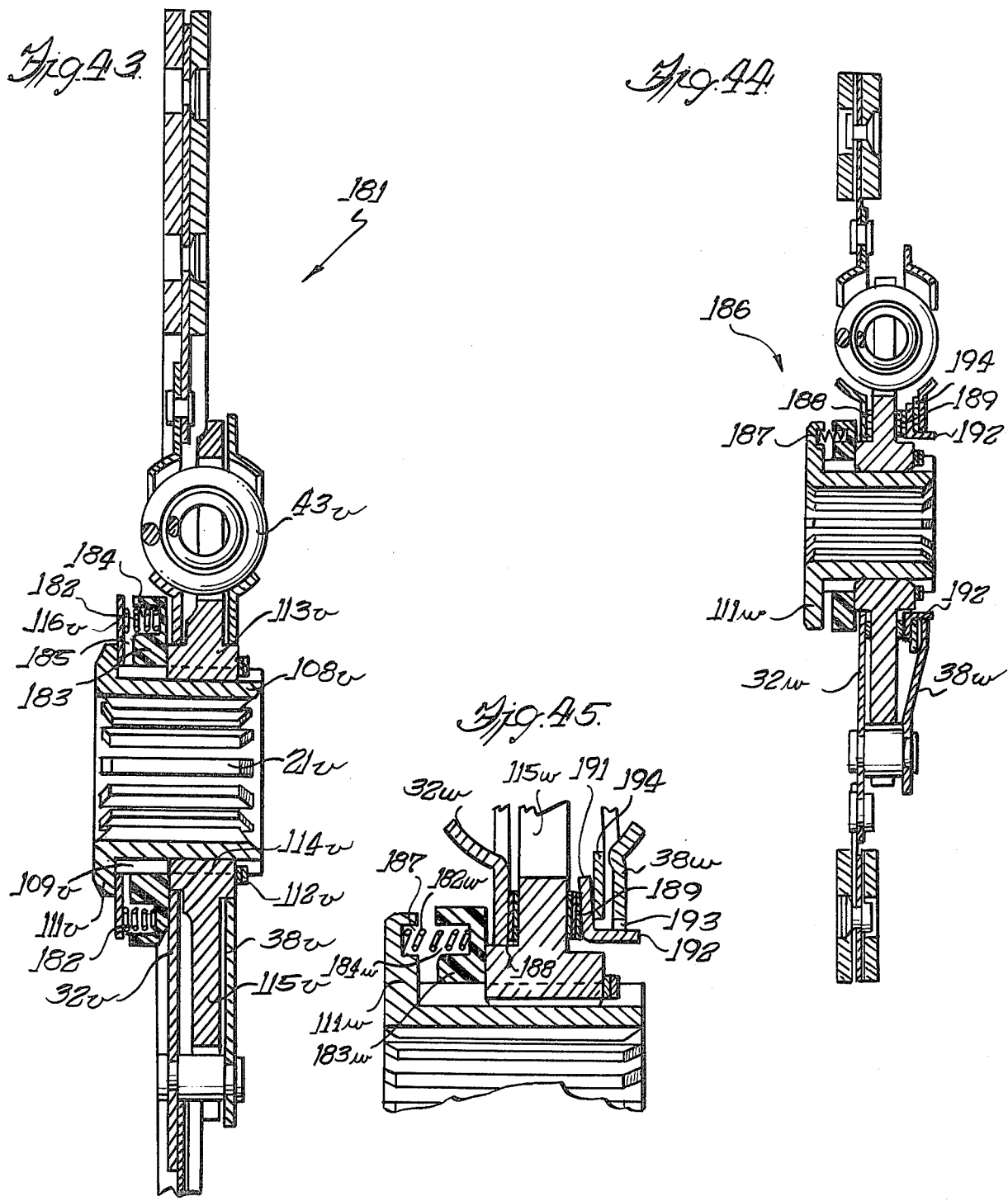

CLUTCH DRIVEN PLATE ASSEMBLY WITH A FLOATING HUB

This application is a continuation-in-part of U.S. application Ser. No. 166,267, filed July 3, 1980 and now abandoned.

BACKGROUND OF THE INVENTION

In an automotive vehicle having a conventional friction clutch between the vehicle engine and the manual transmission, the engine has power and inertia impulses which drive the clutch with an irregular series of thrusts when the transmission is in neutral position and the engine is at idle rpm with the clutch engaged. These impulses will be transmitted to the transmission gears which become excited to oscillate through their backlash space to produce an objectionable rattle. The present invention utilizes a novel clutch hub construction to overcome the transmission gear rattle problem at idle rpm while the transmission is in neutral.

SUMMARY OF THE INVENTION

The present invention comprehends the provision of a clutch driven plate assembly having a novel hub construction to dissipate the engine impulses which previously produced objectionable gear rattle in the transmission in neutral position with the engine at idle rpm. The hub assembly includes an inner hub in splined engagement with the transmission input shaft, an outer hub, and a hub flange integral with one of said hubs and providing a damping connection with the clutch friction facings. The inner and outer hubs are connected together through a helical spline connection allowing relative axial movement between the hubs to dissipate the engine impulses. The spline connection provides internal and external helical splines of a small lead angle so that a screwing and unscrewing action is caused between the hub portions.

The present invention also comprehends the provision of a clutch driven plate assembly having a novel hub construction where the inner hub is driven back and forth through the outer hub to provide a one-way driving action for the transmission and to cause the inertia reaction forces of the transmission to unscrew the hubs instead of generating an oscillating frequency. This action will occur at idle rpm when the magnitude of the engine's vibratory impulses exceeds the low prevailing torque required to rotate the transmission in neutral position to cause a floating action between the rapid transit splines.

The present invention further comprehends the provision of a clutch driven plate assembly having a hub construction with a splined engagement between the inner hub and the outer hub utilizing a rapid transit or helical spline. The lead angle of the spline is sufficiently small to limit the generated thrust between the hubs with the thrust being overwhelmed by the greater sliding friction between the splines during normal driving conditions so that action between the hubs will not occur. The remaining portion of the clutch plate assembly operates in the normal manner.

The present invention also provides a novel clutch driven plate assembly wherein spring means are located in the outer hub to resiliently bias the outer hub relative to the inner hub. The outer and inner hubs have a helical splined connection therebetween. The outer hub may be divided into two members biased in opposite directions by the spring means to eliminate any backlash by locking the spline connection with a wedging force sufficient to prevent any rotational backlash during all drive modes.

The present invention further provides a novel clutch driven plate assembly wherein the inner and outer hubs may include several elements and helical threads are utilized in conjunction with or as a replacement for the helical splined connection between the inner and outer hubs.

The present invention also comprehends the provision of a novel clutch driven plate assembly wherein the helical splined connection is located between the inner hub and the transmission input shaft, and a straight splined connection is provided between the inner and outer hubs.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a clutch driven plate assembly provided with an embodiment of the present invention.

FIG. 2 is a cross sectional view through the clutch plate assembly taken on the irregular line 2—2 of FIG. 1.

FIG. 3 is a partial cross sectional view through the clutch hub taken on the line 3—3 of FIG. 2.

FIG. 4 is an elevational view of the inner hub for the hub assembly.

FIG. 5 is a partial rear elevational view of a second embodiment of clutch driven plate assembly.

FIG. 6 is a cross sectional view taken on the irregular line 6—6 of FIG. 5.

FIG. 7 is a partial cross sectional view taken on the line 7—7 of FIG. 6.

FIG. 8 is an enlarged partial cross sectional view taken on the line 8—8 of FIG. 7.

FIG. 9 is a partial rear elevational view of a third embodiment of clutch plate assembly.

FIG. 10 is a cross sectional view taken on the irregular line 10—10 of FIG. 9.

FIG. 11 is an enlarged partial cross sectional view taken on the line 11—11 of FIG. 10.

FIG. 12 is an enlarged partial cross sectional view taken on the line 12—12 of FIG. 11.

FIG. 13 is an enlarged partial cross sectional view taken on the line 13—13 of FIG. 10.

FIG. 14 is an enlarged partial cross sectional view taken on the line 14—14 of FIG. 13.

FIG. 15 is a partial rear elevational view of a fourth embodiment of clutch driven plate assembly.

FIG. 16 is a cross sectional view taken on the irregular line 16—16 of FIG. 15.

FIG. 17 is an enlarged exploded perspective view of the hub assembly of the clutch plate assembly of FIG. 15.

FIG. 18 is a partial rear elevational view of a fifth embodiment of clutch driven plate assembly.

FIG. 19 is a cross sectional view taken on the irregular line 19—19 of FIG. 18.

FIG. 20 is an enlarged partial cross sectional view taken on the line 20—20 of FIG. 18.

FIG. 21 is a partial rear elevational view of a sixth embodiment of clutch driven plate assembly.

FIG. 22 is a cross sectional view taken on the irregular line 22—22 of FIG. 21.

FIG. 23 is a partial cross sectional view taken on the line 23—23 of FIG. 22.

FIG. 24 is an enlarged cross sectional view taken on the line 24—24 of FIG. 23.

FIG. 25 is an enlarged cross sectional view taken on the line 25—25 of FIG. 23.

FIG. 26 is a cross sectional view similar to FIG. 22 showing a seventh embodiment of clutch plate assembly.

FIG. 27 is a cross sectional view similar to FIG. 26 showing an eighth embodiment of clutch plate assembly.

FIG. 28 is a cross sectional view similar to FIG. 26 showing a ninth embodiment of clutch plate assembly.

FIG. 33 is a partial cross sectional view similar to FIG. 32 of a twelfth embodiment of clutch plate assembly.

FIG. 34 is a partial cross sectional view of a thirteenth embodiment of clutch plate assembly.

FIG. 35 is a partial cross sectional view of a fourteenth embodiment of clutch plate assembly.

FIG. 36 is a partial cross sectional view of a fifteenth embodiment of clutch plate assembly.

FIG. 37 is a partial cross sectional view of a sixteenth embodiment of clutch plate assembly.

FIG. 38 is a cross sectional view with portions broken away of a seventeenth embodiment of clutch plate assembly.

FIG. 39 is a cross sectional view with portions broken away of an eighteenth embodiment of clutch plate assembly.

FIG. 40 is a cross sectional view with the friction facings broken away of a nineteenth embodiment of clutch plate assembly.

FIG. 41 is a cross sectional view with the friction facings broken away of a twentieth embodiment of clutch plate assembly.

FIG. 42 is a cross sectional view with portions broken away of a twenty-first embodiment of clutch plate and transmission input shaft assembly.

FIG. 43 is a partial cross sectional view of a twenty second embodiment of clutch plate assembly.

FIG. 44 is a partial cross sectional view of a twenty third embodiment of clutch plate assembly shown in a vehicle clutch assembly.

FIG. 45 is an enlarged cross sectional view of the hub portion of the clutch plate assembly of FIG. 44.

DESCRIPTION OF THE PREFERRED EMBODIMENTS

Figure 29:
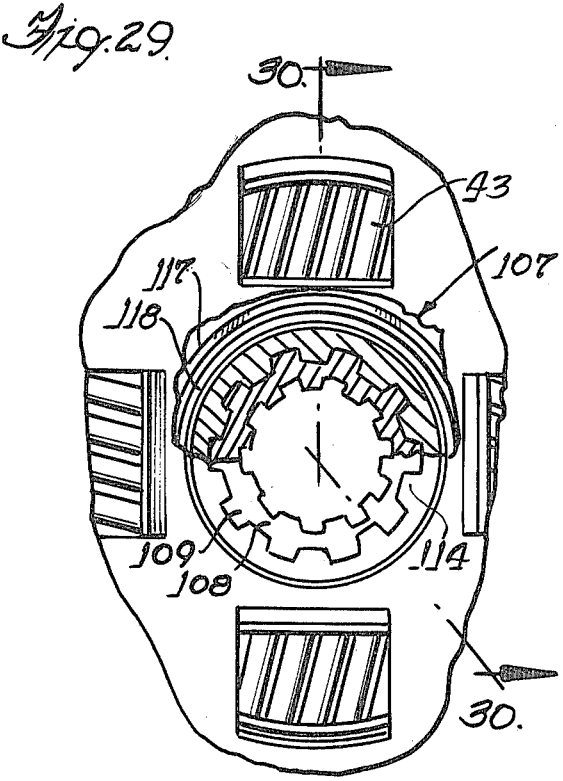
FIG. 29 is a partial rear elevational view, with portions broken away, of a tenth embodiment of clutch plate assembly.

Referring more particularly to the disclosure in the drawings wherein are shown illustrative embodiments of the present invention, FIGS. 1 and 2 disclose a clutch driven plate assembly 10 adapted to be utilized in a friction clutch for an automotive vehicle between the engine and the transmission. The clutch, as seen in FIG. 2, includes a flywheel 11 driven by an engine crankshaft 12, a clutch cover 13 secured to the flywheel, a reciprocable pressure plate 14 operatively connected to the cover to rotate therewith, a diaphragm spring 15 pivotally mounted in the cover to urge the pressure plate against the clutch driven plate assembly 10, and an axially reciprocable release bearing 16 shiftable on the transmission input shaft 17 to engage and pivot the diaphragm spring to release the pressure plate. The clutch assembly operates in a conventional manner upon actuation of the vehicle clutch pedal to engage and disengage the clutch.

The clutch driven plate assembly 10 comprises a two part hub assembly 18 including an inner hub or barrel 19 having internal splines 21 receiving the splined end 22 of the transmission input shaft 17, and rapid transit or helical splines 23 (see FIG. 4) on the exterior surface with stop or snap rings 24 and 25 located in grooves adjacent the ends of the barrel. An outer hub 26 has meshing internal rapid transit or helical splines 27 and an integral outwardly extending radial flange 28 having circumferentially spaced windows 29 and peripheral notches 31 formed therein.

A clutch plate 32 is journalled on the outer hub 26 and has windows 33 and openings 34 adjacent the periphery. Annular friction facings 35,35 are mounted on spring cushions 36 which in turn are secured to the periphery of the clutch plate 32 by rivets 37. A spring retainer plate 38 located on the opposite side of the flange 28 has axially aligned windows 39 and openings 41 to receive spacer rivets or stop pins 42 to secure the clutch plate and spring retainer plate together; the spacer rivets passing through the notches 31 in the flange. Compression springs 43 are received in each set of axially aligned windows 29,33 and 39 to provide a damping action as the clutch is engaged during use.

As seen in FIG. 4, the rapid transit splines 23 have a small lead angle A and the meshing splines 27 have the same lead angle. The clutch assembly operates in a conventional manner except for the action of the hub assembly, wherein the inner hub 19 can oscillate back and forth through the outer hub 26 with a relative rotating motion between them until the hub 19 stops against the stop ring 24 or 25. When the vehicle engine is at idle rpm with the clutch engaged and the transmission in neutral position, the inner and outer hubs 19 and 26 will rotate relative to each other until the hub 19 stops against the stop ring 25. As the engine power impulses drive the transmission through the splines and against the snap ring 25 with a series of thrusts, the inertia of the transmission gears is overcome to accelerate the gears to unscrew the hubs relative to each other to disconnect the transmission inertia from the engine driving forces and thereby prevent an oscillatory condition from occurring which would excite the transmission gears to rattle back and forth through their backlash space.

As the transmission reaction force deteriorates, the hubs will screw back together again. The transmission will be driven to rotate in a forward direction by the engine impulses when the hubs are screwed together and by its own inertia when the hubs are unscrewed. The hubs will screw together when the engine impulses are greater than the reacted transmission inertia force and unscrew when the transmission inertia force is greater than the engine impulses. This ability of the inertia force to overspeed the engine driving forces will prevent an oscillating condition, and the engine impulses will drive the transmission to rotate only when the reacted inertia forces have not unscrewed the hubs or similarly when the driving force is greater than the reacted force. This equalizing and excelling of the forces over each other will create a vibratory environment at the rapid transit spline fit so that they can float to move relative to each other with reduced friction. During normal driving conditions when the assembly is transmitting torque, the action between the hubs will not occur. Due to the small lead angle A of the rapid transit splines, the spline friction will exceed the axial thrust force and the hubs will not move relative to each other. The rest of the assembly operates in the conventional manner.

FIGS. 5 through 8 disclose a second embodiment of clutch driven plate assembly 44 wherein like parts will have the same numeral with a script a. In this embodiment, the inner hub 45 has a helical tooth portion 46 meshing with the helical tooth portion 48 of the outer hub 47. However, the tooth portion 46 is trapped between the clutch plate 32a carrying the friction facings 35a and the spring retainer plate 38a; the plates being secured together by spacer rivets 42a. This assembly operates in the same manner as the assembly of FIGS. 1 through 4 except that the relative axial travel of the inner hub 45 to the outer hub 47 is limited by the retainer plates 32a and 38a.

A third embodiment of the clutch assembly is shown in FIGS. 9 through 14, wherein the assembly 49 includes an outer hub 51 having internal helical splines 52 and an integral radial flange 28b, and the inner hub 30 consists of a pair of hub segments 53,54; each having external helical splines 55 and internal straight splines 21b to engage the splined end 22b of the transmission input shaft. The hub segments 53 and 54 are retained by snap or stop rings 56,56 received in internal grooves in the outer hub 51 and are preloaded apart by a plurality of compression springs 57 received between the helical splines 52 in suitable recesses 58 in the hub segments.

This assembly operates as a conventional automotive clutch driven plate except for the locking action of the hubs which is created by the hub segments 53,54 being forced apart by the springs 57. Urging the hub segments apart causes them to counter-rotate relative to each other as they travel apart in the helical splines 52 of outer hub 51. This counter-rotation causes the internal splines 21b of the hub segments to be mismatched to the amount of backlash space of the internal splines 21b meshing with the splines 22b of the transmission input shaft. The segments 53,54 are moved to their maximum distance apart by the force of springs 57 until the sides 59 and 60 of their splines 55 contact the opposite sides 61 of the splines 52, while sliding against the transmission input shaft splines 22b with the internal spline sides 62 and 63.

The device is now radially locked with a wedging force sufficient to prevent any rotational backlash during all drive modes and will transmit drive torque from the hub spline 52 through the segment spline 63 to the transmission input shaft splines 22b and coast torque from the transmission input shaft splines through the segment spline 62 to the hub spline 60 without backlash. The helix angle B of the splines in outer hub portion 51 and meshing segments 53,54 will be sufficiently small enough to generate a spline friction in excess of the reacted force trying to unlock the segments. During clutch engagement and disengagement, the segments 53 and 54 will slide axially relative to the transmission input shaft splines 22b with a small increase in friction due to the spring force causing the segment splines 62 and 63 to rub against the sides of the input shaft splines, but the locking action will not occur. During axial movement, the spline segments are in equilibrium; e.g. as one segment tries to lock, the other segment unlocks. The rest of the assembly operates in a conventional manner.

FIGS. 15 through 17 disclose a fourth embodiment of clutch driven plate assembly 64 with a hub construction including a front hub 65 having an axially extending barrel 66 with a threaded inner surface 67; the front hub 65 having a radial flange 68 extending radially outwardly with peripheral fingers to be secured to the clutch plate 32c and spring retainer plate 38c by the stop or spacer pins 42c. An inner hub 69 has a forward threaded barrel portion 70 that threads into the surface 67 of the front hub 65 and engages an outer hub 71 with helical splines 72. The damper springs 43c are received in the windows 33c and 39c of the clutch plate 32c and 38c, respectively, in the normal manner and are located in slightly larger windows 73 in the radial flange of outer hub 71.

This assembly operates similar to a conventional automotive type clutch driven plate assembly except for free-play action occurring in the neutral transmission position at engine idle rpm with the clutch engaged. The free play action is caused by the front hub 65 screwing and unscrewing on inner hub 69 at their threaded engagement 67,70. As the hubs 65 and 69 rotate relative to each other, the outer hub 71 is driven axially back and forth due to the helix in its splined engagement with the inner hub 69. The rotational travel of the free-play action is determined by the angle of the helical splined engagement between hubs 69 and 71 and the distance that outer hub 71 can travel between plates 32c and 38c. During normal driving conditions, the free play action does not occur because the prevailing torque required to move a vehicle will keep the hub 71 pressed against the retainer plate 32c due to the helix and results in a desired friction lag.

A fifth embodiment is shown in FIGS. 18 through 20, wherein the hub assembly 74 is similar to that shown in FIGS. 5 through 8 except for the helical spline and like parts will have the same reference numerals as in FIG. 5 with the addition of a script d. The hub assembly 74 includes an inner hub 45d journalled in the clutch plate 32d and having elongated helical splines 75, and an outer hub 47d having short helical splines 76. This clutch assembly also operates like the assembly of FIGS. 5-8 except that the outer hub 47d travels between the plates 32d and 38d relative to inner hub 45d.

FIGS. 21 through 25 disclose a sixth embodiment of clutch plate assembly wherein the hub assembly 77 has an inner hub 78 externally threaded at 79 to engage the mating internally threaded portion 82 of the outer hub 81. A hub segment 83 has internal helical splines 84 meshing with the mating helical spline 85 of the inner hub 78 and is retained by a snap ring 86 secured on the inner hub 78. Also, the segment 83 has straight-sided exterior splines 87 engaging mating splines 88 in the outer hub 81. Compression springs 89 are located in holes 91 in the outer hub 81 and are preloaded to press against the segment 83. The clutch plate 32e and retainer plate 38e are preloaded together by the stop pins 42e against the outer hub 81 to cause a friction lag.

In this embodiment, with the engine at idle conditions, the hub segment 83 moves axially on the helical splined engagement with the inner hub 78 when a relative rotational motion occurs between the hubs 78 and 81 which compresses the springs 89 and simultaneously moves axially on the outer straight spline engagement 87,88. During driving conditions, the assembly operates in a conventional manner.

A seventh embodiment is shown in FIG. 26 wherein the hub assembly 92 includes an inner hub 93 with an integral radial flange 94 and an exterior threaded portion 95 at the forward end of the barrel, and a front hub 65f has an axial barrel 66f with a threaded inner surface 67f engaging the threaded surface 95 of the inner hub and a radial flange 68f secured to the plates by stop pins 42f. This assembly operates similarly to a conventional automotive-type clutch driven member assembly except for the action of the threaded hubs 65f and 93 which cause an axial travel as the damper springs 43f are deflected with a rotational motion. This dual plane motion is intended to be out of phase with engine impulses to cause a stable damping action without resonance.

FIG. 27 discloses an alternate form of the hub assembly of FIG. 26 with like parts having the same reference numerals with a script g. In this embodiment, the assembly 96 has an inner hub 93g with the external threaded surface 95g on the rear end of the hub barrel. A rear hub 65g substantially identical to front hub 65f has a radial flange 68g secured to the plates by the stop pins 42g and is in threaded engagement with the inner hub by the threaded surface 67g of the barrel 66g.

FIG. 28 discloses a further embodiment similar to FIGS. 26 and 27 and having a hub assembly 97 including an inner hub 98 with an integral radial flange 99 at the rear end thereof and an external threaded surface 101 over the entire extent of the hub barrel. The outer hub 102 has an axial flange 103 with an internal threaded surface 104 and a radial flange 105 carrying the friction facings at the outer periphery 106. The outer hub 102 is movable by a screwing or unscrewing action between the retainer plates 32h and 38h as limited by the damper springs 43h. The flange 99 of the inner hub is secured to the plates 32h and 38h by the stop pins 42h. The embodiments of FIGS. 27 and 28 operate in the same manner as that of FIG. 26.

Figure 30:
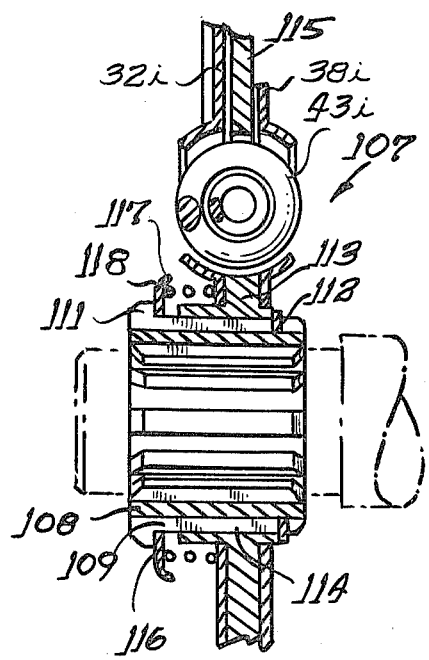
FIG. 30 is a cross sectional view taken on the irregular line 30—30 of FIG. 29.

FIGS. 29 and 30 disclose a tenth embodiment of clutch plate assembly, wherein the hub assembly 107 comprises an inner hub 108 having external helical splines 109 with an enlarged shoulder 111 at the forward end and a stop or snap ring 112 at the rear end. An outer hub 113 has meshing internal helical splines 114 and an integral radial flange 115 cooperating with the clutch plate 32i, the spring retainer 38i and the damper springs 43i; the plates being secured together by stop pins (not shown). An annular spring retainer 116 having an axially extending outer lip 117 is located abutting the shoulder 111 to position a coil spring 118 encompassing the hubs between itself and the clutch plate 32i.

This assembly operates in a manner identical to that shown in FIGS. 1-4, except for the action of the spring 118 which compresses with engine impulses to allow the inner hub 108 to move axially rearwardly and returns the hub to its forward position between engine impulses. Under drive conditions, the assembly operates in a conventional manner.

Figure 31:
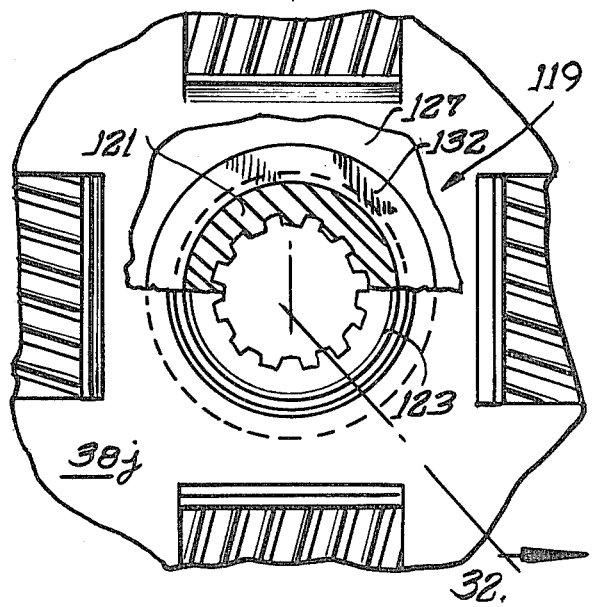
FIG. 31 is a partial rear elevational view, with portions broken away, of an eleventh embodiment of clutch plate assembly.
Figure 32:
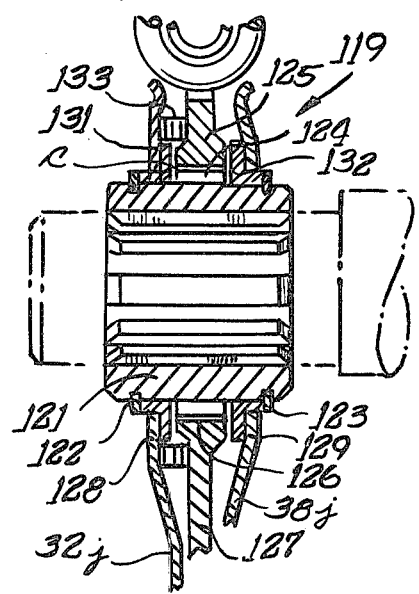
FIG. 32 is a cross sectional view taken on the line 32—32 of FIG. 31.

FIGS. 31 and 32 relate to an eleventh embodiment of hub assembly 119, wherein the inner hub 121 is provided with stop rings 122 and 123 in grooves adjacent the opposite ends and external helical splines 124. The shorter outer hub 125 has internal helical splines 126 and an integral radial flange 127 extending between the clutch driven plate 32j carrying the friction facings and the spring retainer plate 38j. The plates 32j and 38j have axially outwardly offset inner portions 128 and 129, respectively, piloted on annular spacers 131 and 132, which are piloted on the inner hub 121 closely adjacent the stop rings 122 and 123, respectively. A flat coil spring 133 is preloaded between the plate 32j and the outer hub 125 to hold the outer hub against the spacer 132 forming a gap "C". The spacers 131 and 132 are trapped between the plates 32j and 38j and the helical teeth or splines 124 of inner hub 121.

This assembly operates in a similar manner to the embodiment of FIGS. 1-4 except for the action of the spring 133 under engine idle condition which compresses with engine impulses to allow the outer hub 125 to move axially forward and returns the hub to its rearward position between engine impulses. In the drive condition, when the assembly is transmitting drive torque, the outer hub 125 is forced forward by the action of the helical engagement between the splines 124 and 126 to move the spacer 131 against the snap ring 122 to deflect clutch plate 32j and spring retainer plate 38j apart to cause a friction lag between the plate 32j and the spacer 131. In the coast condition, when the assembly is transmitting coast torque, the outer hub 125 is forced rearwardly by the action of the helical spline engagement to move the spacer 132 against the snap ring 123 to deflect plate 38j and plate 32j apart to cause a friction lag between plate 38j and spacer 132.

FIG. 33 discloses a twelfth embodiment of clutch plate assembly 134 similar to the assembly of FIGS. 31 and 32. The inner hub 121k has external helical splines 124k, however, the stop rings 122k and 123k are located on the hub 121k inside of the clutch driven plate 32k and spring retainer plate 38k; also, the annular spacers 131k and 132k are located between the snap rings 122k and 123k and the plates 32k and 38k, respectively, at the outer ends of the splines 124k. The outer hub 125k is axially shorter to allow for movement between the stop rings and has helical splines 126k which are extended at 135 to pass beneath the stop rings. The outer hub also has a shoulder 136 to locate the flat coil spring 133k between the plate 32k and hub 125k. This assembly operates in an identical fashion with that of FIGS. 31 and 32, except the extended portion 135 of the outer hub moves the spacer 132k to expand the plates 32k, 38k apart to cause a friction lag at surface 137 and then stops on the snap ring 123k.

FIG. 34 discloses a thirteenth embodiment of clutch plate assembly 138 similar to the embodiment of FIG. 33 except for the placement of the stop rings and the shape of the outer hub. The stop rings 122m and 123m abut the spacers 131m and 132m; which in turn abut the plates 32m and 38m. The outer hub 125m has an inner portion with helical splines 126m meshing with the helical splines 124m of the inner hub 121m, the portion being enlarged at 139 to form shoulders which extend over the stop rings 122m and 123m. The flat coil spring 133m acts to urge the outer hub towards the plate 38m.

FIG. 35 discloses an optional construction of the embodiment of FIG. 34 wherein the assembly 141 has a pair of generally Z-shaped spacers 142,143 with the upper arms of the spacers extending axially over the stop rings 122n and 123n toward the outer hub 125n. The embodiments of FIGS. 34 and 35 operate in the same manner as the assembly of FIG. 33.

The embodiment of FIG. 36 relates to an assembly 144 generally similar to FIG. 33 except for a single stop ring 145 centrally located in a groove in the helical splines 124p of the inner hub 121p, and the outer hub 125p consists of two hub plates 145,147; each having an inner portion 148 with internal helical splines 149, an offset portion 150 and an outer flange 151 having a window 152 for the damper spring 43p. The two flanges 151,151 abut and are joined by suitable securing means, such as rivets 153, while the inner portions 148,148 are spaced apart and are positioned on opposite sides of the single stop ring 145. This assembly operates in a similar manner to FIG. 33 with the flat coil spring 133p urging the outer hub 125p rearwardly with the hub plate 147 moving the spacer 132p to expand the plates 32p and 38p apart to cause a friction lag on surface 137p and then the hub plate 146 stops on stop ring 145.

The embodiment of FIG. 37 shows an assembly 154 having an inner hub 121q with snap rings 122q and 123q thereon and external straight splines 155. L-shaped spacers 131q and 132q abut the inner surfaces of the spaced plates 32q and 38q, and the outer hub 125q is trapped between plates 32q and 38q and has internal helical splines 126q radially spaced from the inner hub. Interposed between the hubs is an annular plate 156 having external helical splines 157 meshing with splines 126q and internal straight splines 158 meshing with splines 155; and one or more small coil springs 159 have ends abutting the spacer 131q with the opposite ends received in recesses 161 in the plate 156. In the operation of this embodiment, the plate 156 moves axially moving the spacer 132q to expand the plates 32q and 38q apart to cause a friction lag at surface 137q and stops against stop ring 123q; axial movement of plate 156 being caused by rotary movement of outer hub 125q.

FIG. 38 is a larger version of the embodiment of FIGS. 29 and 30 and this assembly 162 will not be described further.

FIG. 39 discloses another clutch assembly 163 similar to that shown in FIGS. 31 and 32, except that the inner hub 121r has an annular groove 164 adjacent the shoulder or flange 165 formed on one end of the hub; the groove being formed in the external helical splines 124r. A single stop ring 123r is located at the end of the inner hub opposite the shoulder 165. The outer hub 125r having internal helical splines 126r is trapped between plates 32r and 38r, and the plates are preloaded against the outer hub to provide a normal friction lag. The hub body 166 extends rearwardly under the plate 38r to normally abut the stop ring and is counterbored at 167 to receive the end of preloaded spiral spring 133r.

FIG. 40 discloses an optional construction of the embodiment of FIG. 39, wherein the assembly 168 has the outer hub 125s loosely mounted between the plates 32s and 38s. The construction of the inner and outer hubs 121s and 125s, respectively, are identical except the shoulder or flange 165s rests against the plate 32s and has a shoulder 169 receiving the inner edge of the plate. In the operation of this embodiment, the spring 133s acts on the outer hub during engine idle condition, and the hubs 121s and 125s are thrust apart by the action of the helical splines 124s and 126s in the drive condition to expand the plates 32s and 38s apart until the outer hub 125s abuts against the stop ring 123s to cause a friction lag at surface 137s. No friction lag is produced in the coast condition when the hubs 121s and 125s are thrust together.

Another embodiment is shown in FIG. 41 wherein the assembly 171 includes an inner hub 121t with external helical splines 124t, the hub containing an annular groove 172 at one end for a preloaded spiral spring 133t. The outer hub 125t has internal helical splines 126t and includes an inner body portion 173 and an outer body portion 174 trapped between the plates 32t and 38t; the inner portion 173 having a greater axial dimension than the spacing between the plates and is provided with an internal annular groove 175. A multi-wrap stop ring 176 engages in a groove in the inner hub and is positioned in groove 175 to limit relative movement between the inner and outer hubs.

Another embodiment is shown in FIG. 42 wherein the assembly 177 includes a transmission input shaft 17u having a splined end 22u with external helical splines 178 formed thereon, an inner hub or sleeve 121u having internal helical splines 124u and external straight splines 179, and an outer hub 125u trapped between the plates 32u and 38u and having internal straight splines 181 meshing with splines 179. Stop rings 122u and 123u are mounted on the shaft end 22u to axially retain the inner hub 121u, and a groove 182 on the inner hub 121u contains a preloaded spiral spring 133u. The operation of this assembly is substantially the same as the embodiment of FIGS. 29 and 30 except the meshing helical splines are between the inner hub and the transmission input shaft.

FIG. 43 discloses another embodiment of clutch plate assembly 181 similar to that shown in FIGS. 29 and 30 with an inner hub 108v, an outer hub 113v, a clutch plate 32v, a spring retainer plate 38v and damper springs 43v. The inner hub has internal longitudinal splines 21v to engage the splined end of a transmission input shaft and exterior helical splines 109v. An enlarged shoulder 111v is provided at the forward end of the hub, and a stop or snap ring 112v is located in an annular groove at the opposite hub end. The outer hub 113v has meshing internal helical splines 114v and an integral radial flange 115v cooperating with the clutch plate 32v, spring retainer plate 38v and the damper springs 43v.

An annular spring retainer 116v encompasses the inner hub and abuts the hub shoulder 111v with coil springs 182, each having one end engaging the retainer 116v. A non-metallic annular spacer 183 also encompasses the inner hub and provides a plurality of axially extending pockets 184 receiving the opposite ends of the coil springs 182; the springs urging the spacer into engagement with the outer hub 113v. The spacer is preferably formed of a resilient plastic.

This embodiment operates in a manner substantially the same as FIGS. 1 through 4 except the spacer 183 moves with the outer hub 113v, clutch plate 32v and spring retainer plate 38v with the coil springs 182 being compressed with engine impulses to allow the inner hub 108v to axially reciprocate; the non-metallic spacer acting as an insulator to prevent metallic noises from occurring. The springs 182 normally push the hubs apart to provide an endplay spacing 185. In the drive condition of the clutch, the spacer is impacted between the retainer 116v and the outer hub 113v.

FIGS. 44 and 45 disclose a further embodiment of clutch plate assembly 186 similar to the embodiment of FIG. 43. In this embodiment, the inner hub flange or shoulder 111w is extended radially and contains circumferentially spaced pockets 187 to receive the ends of the coil springs 182w; the pockets 187 being axially aligned with the pockets 184w in the non-metallic spacer 183w.

Between the clutch plate 32w and the outer hub flange 115w are one or more spacer washers 188, and additional spacer washers 189 are positioned on the opposite side of the flange. A friction disc 191 engages the washers 189 and has a plurality of circumferentially equally spaced rearwardly extending tabs 192 on the inner edge of the disc and projecting into notches 193 formed in the inner edge of the spring retainer plate 38w. Also, a cup or diaphragm spring 194 is positioned between the friction disc 191 and the spring retainer plate 38w to urge the disc into frictional engagement with the washers 189 to provide a friction drag on operation of the damper assembly. This assembly operates in the same manner as the assembly of FIG. 43 with the addition of the controlled friction damping.

I claim:

1. In a clutch driven plate assembly for an automotive vehicle clutch operatively connected to a transmission input shaft, wherein the assembly includes a radial hub flange operatively connected to friction facings adapted to be positioned between an engine flywheel and a clutch pressure plate, the improvement comprising a multipart hub assembly including an inner hub operatively connected to the transmission input shaft and an outer hub, the radial hub flange being integral with one of said hubs, and a helical connection interposed between said inner and outer hubs wherein one of said inner and outer hubs has axially elongated helical splines and said other hub has shorter splines to allow a substantial relative axial movement between the hubs upon rotation of said outer hub.

2. A clutch driven plate assembly as set forth in claim 1, in which said helical connection comprises mating helical splines formed on the hubs with the splines being positioned at a relatively small angle to the axis of the hubs.

3. A clutch driven plate assembly as set forth in claim 2, in which said inner hub has elongated helical splines and stop rings adjacent the ends thereof, and said outer hub has a shorter axial dimension than the inner hub.

4. A clutch driven plate assembly as set forth in claim 3, wherein with the vehicle transmission in neutral and the clutch engaged, the inner hub moves axially relative to the outer hub upon engine impulses while the engine is at idle rpm.

5. A clutch driven plate assembly as set forth in claim 2, wherein the helical splines of said outer hub are shorter than the meshing splines of the inner hub so that the inner hub can move axially relative to the outer hub.

6. A clutch driven plate assembly as set forth in claim 2, wherein said inner hub is formed as two axially aligned members, each having external helical splines meshing with the helical splines of said outer hub.

7. A clutch driven plate assembly as set forth in claim 6, including resilient means between said inner hub members biasing the members axially outward, and a pair of stop rings in the outer hub portion limiting movement of said members.

8. A clutch driven plate assembly as set forth in claim 7, wherein biasing of the inner hub members relative to the outer hub causes locking of the axial splines on a transmission input shaft due to the action of the helical splined connection.

9. A clutch driven plate assembly as set forth in claim 2, including a clutch plate and a spring retainer plate secured together to sandwich said radial hub flange therebetween, said plates and hub flange having axially aligned sets of circumferentially spaced windows therein, and damper springs received in each aligned set of windows, one of said plates or said hub flange carrying said friction facings at the outer periphery thereof.

10. A clutch driven plate assembly as set forth in claim 9, in which the radial hub flange is integral with said outer hub and closely held between said clutch plate and spring retainer plate so as to prevent axial movement thereof.

11. A clutch driven plate assembly as set forth in claim 9, including a forward hub having a radial flange secured to said plates and internal threads engaging external threads on said inner hub.

12. A clutch driven plate assembly as set forth in claim 11, wherein said first mentioned hub flange is integral with said outer hub.

13. A clutch driven plate assembly as set forth in claim 9, in which at least one of said clutch driven plate and spring retainer plate has outwardly offset central body portions, a pair of annular spacers engaging said plate body portions, and resilient means biasing said outer hub in the rearward axial direction.

14. A clutch driven plate assembly as set forth in claim 13, in which each spacer is L-shaped in cross section with the horizontal portion abutting a stop ring and the vertical portion abutting one of said plates.

15. A clutch driven plate assembly as set forth in claim 14, in which said resilient means are located between the clutch driven plate and the outer hub.

16. A clutch driven plate assembly as set forth in claim 13, in which stop rings are located on said inner hub inside of said spacers, and said outer hub has an annular shoulder receiving said resilient means.

17. A clutch driven plate assembly as set forth in claim 16, in which said stop rings are spaced from said spacers and the helical splines of said outer hub extend axially under said stop rings.

18. A clutch driven plate assembly as set forth in claim 16, in which said stop rings abut said spacers, and said outer hub has shortened helical splines between said stop rings.

19. A clutch driven plate assembly as set forth in claim 16, in which said spacers are generally Z-shaped with an outer arm extending inwardly over the top of an adjacent abutting stop ring to be engaged by said outer hub prior to the outer hub abutting a stop ring.

20. A clutch driven plate assembly as set forth in claim 13, wherein said resilient means is a flat coil spring.

21. A clutch driven plate assembly as set forth in claim 9, in which said clutch driven plate and spring retainer plate have outwardly offset central body portions, a pair of annular spacers engaging said plate body portions, said outer hub including a pair of hub flanges secured together and having outwardly offset inner body portions with internal helical splines thereon forming a central inwardly opening internal annular groove, a stop ring on said inner hub located in said annular groove, and resilient means biasing said inner hub rearwardly.

22. A clutch driven plate assembly as set forth in claim 9, wherein said outer hub is conformably received between said plates and is radially outwardly spaced from said inner hub, said inner hub having external axially straight splines and said outer hub having internal helical splines, and an annular plate biased toward one of said plates and having internal straight splines and external helical splines.

23. A clutch driven plate assembly as set forth in claim 22, including a pair of annular spacers engaging both of said plates and said stop rings.

24. A clutch driven plate assembly as set forth in claim 9, in which said outer hub is conformably received between said plates and has a stepped rearwardly extending body portion extending under the spring retainer plate, said inner hub having elongated helical splines terminating at one end in a radial flange, a stop ring at the opposite end of said inner hub, and resilient means abutting said radial flange and said outer hub body to bias said outer hub against said stop ring.

25. A clutch driven plate assembly as set forth in claim 1, in which said helical connection comprises an exterior screw thread on at least a portion of the inner hub and an interior screw thread on the outer hub.

26. A clutch driven plate assembly as set forth in claim 25, wherein said hub flange is integral with the inner hub, and said outer hub includes a radial flange secured to a clutch driven plate and spring retainer plate sandwiching said hub flange.

27. A clutch driven plate assembly as set forth in claim 26, in which said outer hub flange is secured adjacent the clutch driven plate, with the threads formed on the forward end of the inner hub.

28. A clutch driven plate assembly as set forth in claim 26, in which said outer hub flange is secured adjacent the spring retainer plate, with the threads on the rearward end of said inner hub.

29. A clutch driven plate assembly as set forth in claim 25, wherein said inner hub has a hub flange at one end secured to a clutch driven plate and spring retainer plate, and the inner hub threads extend from one end to the last mentioned hub flange at the opposite end, and said first mentioned hub flange is integral with said outer hub and carries the friction facings.

30. A clutch driven plate assembly as set forth in claim 25, including a stop ring adjacent the end of the inner hub opposite to the threaded engagement, helical splines on the end of the inner hub opposite the threaded end, said outer hub having a cylindrical housing with internal axial splines encompassing the inner hub member, a hub segment received between said inner and outer hubs and having internal helical splines and external axial splines, and resilient means biasing said hub segment toward said stop ring.

31. A clutch driven plate assembly as set forth in claim 30, wherein said hub flange is integral with said outer hub, and said resilient means comprises at least two compression springs received in recesses in said outer hub and engaging said hub segment.

32. In a clutch driven plate assembly for an automotive vehicle clutch operatively connected to a transmission input shaft, wherein the assembly includes a radial hub flange operatively connected to friction facings adapted to be positioned between an engine flywheel and a clutch pressure plate, the improvement comprising a multipart hub assembly including an inner hub operatively connected to the transmission input shaft and an outer hub having the radial hub flange integral therewith, and a helical connection interposed between said hubs to allow relative axial movement therebetween, an exterior shoulder formed at one end of said inner hub, an annular spring retainer abutting said shoulder and a stop ring at the opposite end of the inner hub, and a coil spring encompassing the inner hub with one end abutting said spring retainer and the opposite end abutting said outer hub.

33. A clutch driven plate assembly as set forth in claim 32, in which said spring retainer has an outer axial lip encompassing the end of said spring.

34. A clutch driven plate assembly as set forth in claim 32, wherein said helical connection comprises mating helical splines formed on facing cylindrical surfaces of said hubs with the splines being positioned at a relatively acute angle to the axis of the hubs.

35. A clutch driven plate assembly as set forth in claim 34, in which the helical splines on said inner hub extend substantially the length of the hub between said shoulder and opposite end, and said outer hub has a shorter axial dimension than the inner hub with its splines extending the length of the hub.

36. In a clutch driven plate assembly for an automotive vehicle clutch operatively connected to a transmission input shaft, wherein the assembly includes a clutch plate carrying friction facings at the outer periphery thereof and a spring retainer plate secured together to sandwich a radial hub flange therebetween, said plates and hub flange having axially aligned sets of circumferentially spaced windows therein, and damper springs received in each aligned set of windows, the improvement comprising a multipart hub assembly including an inner hub having an internally splined passage receiving the transmission input shaft and an outer hub having the radial hub flange integral therewith, and a helical connection comprising mating helical splines formed on the hubs with the splines being positioned at a relatively small angle to the axis of the hubs, said inner hub having elongated helical splines with an annular groove formed therein adjacent one end of the hub, a stop ring positioned on said inner hub intermediate the ends thereof, and said outer hub being conformably received between said plates and having an axially enlarged inner body portion extending under the plates, said inner body portion having internal helical splines and an internal annular groove interrupting said splines intermediate the ends thereof to loosely receive said stop ring, and resilient means received in said inner hub groove and abutting an end of said outer hub body portion so that said inner hub moves axially relative to said outer hub upon rotation of said outer hub.

37. A clutch driven plate assembly as set forth in claim 36, in which said stop ring and outer hub groove cooperate to limit relative axial movement between said inner and outer hubs.

38. In a clutch driven plate assembly for an automotive vehicle clutch operatively connected to a transmission input shaft, wherein the assembly includes a radial hub flange operatively connected to friction facings adapted to be positioned between an engine flywheel and a clutch pressure plate, the improvement comprising a multipart hub assembly including an inner hub operatively connected to the transmission input shaft and an outer hub splined to the inner hub and having the radial hub flange integral therewith, and a helical connection interposed between said inner hub and said transmission input shaft, said transmission input shaft having external helical splines with stop rings adjacent the opposite ends thereof, said inner hub having internal helical splines and external axially straight splines, and said outer hub having internal axially straight splines, said inner hub having an annular groove interrupting said external splines adjacent one end, and resilient means received in said groove and abutting said outer hub, said inner hub having internal helical splines which are shorter than the meshing external helical splines of the transmission shaft and external axial splines that are longer than the meshing internal axial splines of said outer hub to allow a substantial relative axial movement of the inner hub relative to the outer hub and transmission input shaft.

39. A clutch driven plate assembly as set forth in claim 38, in which said outer hub is conformably received between said plates and has an enlarged inner body portion extending axially under said plates.

40. In a clutch driven plate assembly for an automotive vehicle clutch operatively connected to a transmission input shaft, wherein the assembly includes a radial hub flange operatively connected to friction facings adapted to be positioned between an engine flywheel and a clutch pressure plate, the improvement comprising a multipart hub assembly including an inner hub operatively connected to the transmission input shaft and an outer hub having the radial hub flange integral therewith, a helical connection interposed between said hubs to allow axial movement of the inner hub relative to the outer hub upon rotation thereof, an exterior shoulder formed at one end of said inner hub, a stop ring at the opposite end of the inner hub, an annular nonmetallic spacer encompassing the inner hub and positioned between said shoulder and said outer hub and having a plurality of axially extending pockets opening toward said shoulder, and a plurality of compression springs received in said pockets and abutting said shoulder to yieldably bias said annular spacer against said outer hub and bias said outer hub against said stop ring.

41. A clutch driven plate assembly as set forth in claim 40, including an annular spring retainer encompassing said inner hub and yieldably biased against said shoulder, said compression springs engaging said spring retainer.

42. A clutch driven plate assembly as set forth in claim 40, wherein said exterior shoulder has a plurality of axially extending pockets formed therein opening towards and axially aligned with the pockets in the annular spacer, said pockets in said shoulder receiving the ends of the compression springs.

43. A clutch driven plate assembly as set forth in claim 40, including a clutch plate carrying said friction facings at the outer periphery thereof and a spring retainer plate secured together to sandwich said radial hub flange therebetween, said plates and hub flange having axially aligned sets of circumferentially spaced windows therein, damper springs received in each aligned set of windows, one or more shims located between the outer hub flange and both the clutch plate and spring retainer plate, and a friction plate and cupped spring located between said shims and spring retainer plate to provide friction damping.

44. A clutch driven plate assembly as set forth in claim 43, wherein said friction plate has a plurality of axially extending tabs on its inner periphery, said spring retainer plate having notches on its inner periphery receiving said tabs.

45. A clutch driven plate assembly as set forth in claim 40, in which said helical connection includes helical splines on the exterior surface of said inner hub extending from said shoulder to the opposite end, and mating helical splines on the interior surface of and extending the length of the outer hub.

46. A clutch driven plate assembly as set forth in claim 45, wherein said outer hub has an axial dimension substantially shorter than said inner hub, and said helical splines are oriented at an acute angle to the axis of said hubs.

47. In a clutch driven plate assembly for an automotive vehicle clutch operatively connected to a transmission input shaft, wherein the assembly includes a clutch plate carrying friction facings at the outer periphery thereof and a spring retainer plate secured together to sandwich a radial hub flange therebetween, said plates and hub flange having axially aligned sets of circumferentially spaced windows therein, and damper springs received in each aligned set of windows, the improvement comprising a multipart hub assembly including an inner hub having an internally splined passage receiving the transmission input shaft and an outer hub having the radial hub flange integral therewith, and a helical connection comprising mating helical splines formed on the hubs with the splines being positioned at a relatively small angle to the axis of the hubs, wherein said splines of the inner hub do not extend the length of the hub, and said clutch plate and spring retainer plate are journalled on said inner hub and abut the opposite ends of the inner hub splines, said outer hub and splines being shorter than the length of the inner hub splines so that the outer hub moves axially relative to said inner hub as limited by said plates.

48. In a clutch driven plate assembly for an automotive vehicle clutch operatively connected to a transmission input shaft, wherein the assembly includes a clutch plate carrying friction facings at the outer periphery thereof and a spring retainer plate secured together to sandwich a radial hub flange therebetween, said plates and hub flange having axially aligned sets of circumferentially spaced windows therein, and damper springs received in each aligned set of windows, the improvement comprising a multipart hub assembly including an inner hub having an internally splined passage receiving the transmission input shaft and an outer hub having the radial hub flange integral therewith, and a helical connection comprising mating helical splines formed on said hubs to allow relative axial movement therebetween with the splines being positioned at a relatively small angle to the axis of the hubs, said outer hub being loosely received between said plates and having a stepped rearwardly projecting body portion extending under said spring retainer plate, said inner hub having elongated helical splines terminating at one end in a radial flange having a shoulder on the front surface, a stop ring at the opposite end of said inner hub, and resilient means abutting said flange and outer hub body to bias said outer hub against said stop ring, said clutch driven plate overlapping said flange and received in said flange shoulder.

49. In a clutch driven plate assembly for an automotive vehicle clutch operatively connected to a transmission input shaft, wherein the assembly includes a clutch plate carrying friction facings at the outer periphery thereof and a spring retainer plate secured together to sandwich a radial hub flange therebetween, said plates and hub flange having axially aligned sets of circumferentially spaced windows therein, and damper springs received in each aligned set of windows, the improvement comprising a multipart hub assembly including an inner hub having an internally splined passage receiving the transmission input shaft and an outer hub having the radial hub flange integral therewith, and a helical connection comprising mating helical splines formed on said hubs with the splines being positioned at a relatively small angle to the axis of the hubs, said splines of the inner hub terminating short of the ends of the hub, and said clutch plate and spring retainer plate are journalled on said inner hub and abut the ends of the outer hub splines, and said inner hub splines are shorter than the length of the outer hub splines so that the inner hub moves axially relative to said outer hub as limited by said plates upon rotation of the outer hub.

50. In a clutch driven plate assembly for an automotive vehicle clutch operatively connected to a transmission input shaft, wherein the assembly comprises a multiplate hub assembly including an outer hub receiving torsional forces from a vehicle engine and an inner hub operatively connected to the transmission input shaft, and a connection between said inner and outer hubs to translate the torsional force applied to said outer hub to an axial force reciprocating said inner hub relative to the input shaft.

* * * * *